United States Patent Office
3,210,426
Patented Oct. 5, 1965

3,210,426
PREPARATION OF IMINOBISALKYLAMINES
Joseph Levy and Emanuel Goldstein, Paramus, N.J.,
assignors to Universal Oil Products Company, Des
Plaines, Ill., a corporation of Delaware
No Drawing. Filed Aug. 13, 1962, Ser. No. 216,331
11 Claims. (Cl. 260—583)

This invention relates to a process for preparing iminobisalkylamines and particularly to a process for obtaining the aforementioned amines in a relatively greater yield and higher purity than was hereinbefore available.

The iminobisalkylamines which are the desired products prepared by the process of the present invention will find a wide variety of uses in the chemical field. For example, the compounds may be used as polyamides in the fields of plastics, synthetic fibers, etc. as well as cross-linking agents for epoxides. Heretofore, difficulties have been experienced when treating iminodialkylnitriles with hydrogen to form the desired product. For example, reduction of the dialkylnitriles has proceeded erratically and unwanted side reactions have occurred, there being obtained relatively large amounts of a high boiling residue with an attendant lowering of the yield. For example, a well known side reaction in the hydrogenation of nitriles is the formation of higher molecular weight secondary amines.

It is therefore an object of this invention to provide an improved process for treating iminodialkylnitriles with hydrogen to prepare iminobisalkylamines.

A further object of this invention is to provide an improved process for the hydrogenation of iminodialkylnitriles by carrying out the hydrogenation under controlled conditions whereby the desired product comprising an iminobisalkylamine is obtained in a relatively high yield with a correspondingly greater degree of purity.

Taken in is broadest aspect one embodiment of this invention resides in a process for the preparation of an iminobisalkylamine which comprises treating an iminodialkylnitrile with hydrogen at hydrogenation conditions in the presence of ammonia and a hydrogenation catalyst at a temperature in the range of from about 50° to about 80° C., and recovering the desired amine.

A further embodiment of this invention is found in a process for the preparation of an iminobisalkylamine which comprises treating an iminodialkylnitrile with hydrogen at a temperature in the range of from about 50° to about 80° C. and at a pressure in the range of from about 300 to about 600 pounds per square inch in the presence of ammonia and a nickel hydrogenation catalyst, and recovering the desired amine.

A specific embodiment of this invention is found in a process for the preparation of iminobispropylamine which comprises treating β,β'-iminodipropionitrile with hydrogen at a temperature in the range of from about 50° to about 80° C. and at a pressure in the range of from about 300 to about 600 pounds per square inch in the presence of ammonia, said ammonia being present in a mole ratio of from about 3:1 to about 5:1 per mole of iminodipropionitrile and a nickel hydrogenation catalyst, said catalyst being present in an amount of from about 15% to about 25% by weight of the iminodipropionitrile, and recovering the desired iminobispropylamine.

Other objects and embodiments referring to alternative iminodialkylnitriles and hydrogenation catalysts will be found in the following further detailed description of this invention.

As hereinbefore set forth this invention relates to a process for preparing iminobisalkylamines, said process consisting of treating an iminodialkylnitrile with hydrogen at relatively mild operating conditions of temperature and pressure and in the presence of a nickel hydrogenation catalyst. Inasmuch as the desired product must be obtained in a relatively high yield based upon the starting material and with a relatively high degree of purity, it is necessary to effect the hydrogenation under these certain conditions of temperature and pressure so as to attain the desired result. When the amount of ammonia present in the reaction system is maintained within a certain range and the reaction is effected at certain operating conditions of temperature and pressure, said conditions being hereinafter set forth in greater detail, the above stated objects of the invention, namely, superior yields of the desired product which are in a relatively high degree of purity are obtained. It is contemplated within the scope of this invention that the process may be effected, if so desired, in the presence of certain organic solvents and particularly hydroxy substituted organic solvents, the preferred solvents being alcohols such as methanol, ethanol, propanol, isopropanol, butanol, methyl isobutyl carbinol, etc., but the use of said solvents is not critical to the success of the process. If so desired, an aqueous system may be utilized, however, in the preferred embodiment of the invention, a substantially anhydrous medium is used.

It has now been unexpectedly found that the hydrogenation or reduction of the iminodialkylnitrile, when utilizing an excess of ammonia, the amount of excess being hereinafter discussed in greater detail, proceeds with the obtention of maximum yields and greater purity when carried out at a relatively low temperature range of from about 50° to about 80° C. and preferably in a range of from about 50° to about 75° C. Pressures utilized are not critical and will range from about 300 to about 600 pounds per square inch or higher, preferably in a range of from about 400 to 550 pounds per square inch. This is in contradistinction to the prior art which taught that temperatures of 100° C. or more are required in order to attain a maximum yield of a desired product.

It is contemplated within the scope of this invention that nickel hydrogenation catalysts which are well known in the art may be utilized in the process of this invention. Examples of hydrogenation catalysts which may be used include Raney nickel, nickel composited on kieselguhr, etc. It is to be understood that the aforementioned hydrogenation catalysts are only representatives of the type of hydrogenation catalyst which may be used and that the process of the present invention is not necessarily limited thereto. Other hydrogenation catalysts may also be utilized although not necessarily with equivalent results. The hydrogenation of the iminodialkylnitrile to form the desired iminobisalkylamine is effected in the presence of these catalysts which are present in the reaction mixture in an amount of from about 15% to about 25% or more based on the weight of the iminodialkylnitrile. The amount of catalyst which is required will be dependent to a certain extent upon the temperature at which the hydrogenation is effected. For example, when temperatures which are utilized are in a range of from about 75° to about 80° C., the reaction may be effected by utilizing the catalyst in an amount of about 15% to about 20% by weight of the nitrile. However, if lower operating conditions of temperature are utilized, the amount of catalyst present may of necessity be increased to about 25% or more. In addition, it has also been found that the catalyst may be reused in subsequent batch operations without the necessity of regenerating or renovating said catalyst after a reaction has been effected and before another reaction can be run.

Although it is well known that the use of ammonia in excess in the reduction of nitriles suppresses the formation of secondary amine by-products, we have found that the ammonia present in the reaction mixture should be within a certain range in order to effect maximum suppression of secondary amine formation, thereby reducing the amount of impurities which may be present in the reaction product. For example, when ammonia is present in an amount of about 2 moles of ammonia per mole of iminodialkylnitrile low yields with correspondingly low degrees of purity will be obtained. When the mole ratio of ammonia to dinitrile is in a range of from about 3:1 to about 5:1, it will allow the recovery of the desired product in an economically attractive yield percentage with correspondingly high degrees of purity. However, even when utilizing this relatively large excess of ammonia, the best results are obtained, as hereinbefore noted, when the temperature of the reaction is within the range of from about 50° to about 80° C.

Examples of iminodialkylnitriles which may be reduced or hydrogenated according to the process of this invention include iminodiacetonitrile, $\alpha,\alpha'$-iminodipropionitrle, $\beta,\beta'$-iminodipropionitrle, $\alpha,\alpha'$-iminodibutyronitrile, $\beta,\beta'$-iminodibutyronitrile, $\gamma,\gamma'$-iminodibutyronitrile, etc. It is to be understood that the aforementioned starting materials are only representative of the class of compounds which may be used and that the present invention is not necessarily limited thereto.

The process of the present invention may be effected in any suitable manner and may comprise either a batch or continuous type operation. For example, when a batch type operation is used, a quantity of the starting materials comprising the iminodialkylnitrile along with the hydrogenation catalyst and the organic solvent containing a hydroxy substituent, if so desired, are placed in an appropriate apparatus such as an autoclave. The autoclave is flushed, sealed and a sufficient amount of ammonia added so that said ammonia is present in a mole ratio of from about 3:1 to about 5:1 moles of ammonia per mole of nitrile to be reduced. The autoclave is then heated to the desired temperature and hydrogen is pressured in until the desired reaction pressure has been reached. The autoclave and contents thereof are maintained at the proper operating conditions of temperature and pressure for a predetermined residence time which may be in a range of from about 1 to about 15 hours or more. Upon completion of the desired residence time which is evidenced by the fact that absorption of hydrogen ceases, the autoclave and contents thereof are then cooled, the excess pressure is vented, and the reaction mixture is removed. The reaction product is filtered to remove the catalyst, the apparatus and catalyst are then washed with additional solvent, following which the solvent is stripped from the combined filtrates. The reaction product is then distilled under reduced pressure and the desired reaction product is recovered.

In addition it is also contemplated within the scope of this invention that the process may be effected in a continuous manner, although not necessarily with equivalent results. For example, if such a process is used, the appropriate apparatus is maintained at the desired operating conditions of temperature and pressure. A quantity of the starting materials is continuously charged to the reactor and the contents, a hydrogenation catalyst of the type hereinbefore set forth. If so desired, the reaction product may be dissolved in a hydroxy substituted organic solvent and charged to said apparatus in a single line. Additionally, ammonia and hydrogen are also continuously charged to the reaction vessel through separate lines. Upon completion of the desired residence time the reaction product is continuously withdrawn from the reactor, separated from unreacted starting materials and/or undesired side reactions by conventional means such as fractional distillation under reduced pressure and recovered, the unreacted starting materials being recycled to the reactor to form a portion of the feed stock.

The following examples are given to illustrate the process of the present invention which, however, are not intended to limit the generally broad scope of the present invention in strict accordance therewith.

*Example I*

This example was run in order to illustrate the necessary conditions for the obtention of the reaction product in a maximum percentage of yield and with a maximum degree of purity.

A mixture of 308 grams (2.25 moles) of $\beta,\beta'$-iminodipropionitrile which assayed about 90% dinitrile, 40 grams of methanol and 62 grams of a hydrogenation catalyst comprising nickel composited on kieselguhr were charged to a shaking autoclave. The autoclave was sealed and flushed with hydrogen. Following this, 188 grams (11 moles) of ammonia was charged to the autoclave, after which the mixture was heated to a temperature of about 75° C. At this point the pressure was about 270 pounds per square inch. Hydrogen gas was pressured into the autoclave until a total pressure of about 550 pounds per square inch was reached. The temperature of the autoclave was maintained at about 75° C. and the pressure maintained in a range of from about 400 to about 550 pounds per square inch. After a period of about 10.5 hours absorption of hydrogen ceased after the theoretical amount had been taken up. The autoclave and contents thereof were then cooled to about 25° C., the excess pressure was vented, the reaction mixture removed from the autoclave and filtered to remove the catalyst. The apparatus and catalyst were washed with an additional amount of methanol and the combined filtrates were stripped of methanol atmospherically to about 150° C. The remainder was then fractionally distilled under reduced pressure. A cut comprising 3,3'-iminobispropylamine weighing 246.7 grams and having a refractive index, $n_D^{20}$ 1.4820, was recovered, said cut having a boiling point of 120° C. at 6 mm. pressure. The yield amounted to 82.7% of theory and had a purity of 98.3%.

*Example II*

This example was run to illustrate that only a moderately higher temperature effects the yield of the desired product in an adverse manner.

A mixture comprising 615.8 grams (4.57 moles) of $\beta,\beta'$-iminodipropionitrile, 120 grams of methanol and 61.6 grams of a hydrogenation catalyst comprising nickel composited on kieselguhr was charged into a shaking autoclave. The autoclave was sealed and flushed with hydrogen. Following this 190 grams (11.18 moles) of ammonia was charged to the autoclave which was then heated to a temperature of about 85° C. At this point the pressure was 250 pounds per square inch. Hydrogen was then pressured in and the autoclave maintained at a temperature in the range of from about 85° C. to about 90° C. and at a pressure of from 350 pounds per square inch to 550 pounds per square inch for a period of about 10.5 hours. It was noted that there was no absorption of hydrogen during the last two hours. At the end of this time the autoclave and contents thereof were cooled to room temperature (25° C.) and excess ammonia was vented. The reaction mixture was removed from the autoclave and filtered to remove the catalyst. Following this the autoclave and catalyst were then washed with an additional 300 grams of methanol which was combined with the filtered reaction mixture. The methanol was flashed off at 150° C. and the remainder subjected to fractional distillation under reduced pressure. There was recovered from this a 69.2% yield of iminobispropylamine.

*Example III*

A similar experiment was run in which $\beta,\beta'$-iminodipropionitrile was reduced with hydrogen at a temperature in the range of from about 105° to about 110° C. in the presence of 2 moles of ammonia per mole of iminodipropionitrile and 10% by weight of wet Raney nickel catalyst. At the conclusion of the reaction the autoclave was cooled, the excess pressure was vented and the reaction mixture separated from the catalyst by filtration. After steps similar to that set forth in the above examples there was obtained a 59% yield of iminobispropylamine.

It is to be noted from the above examples that when the reduction with hydrogen of an iminodialkylnitrile was effected utilizing ammonia in a mole ratio of about 3:1 to about 5:1 per mole of nitrile, hydrogenation catalyst in an amount of from about 15% to about 25% by weight of the nitrile, along with the employment of lower operating conditions of temperature an improved yield of the desired iminobisalkylamine was obtained. These conditions are specifically set forth in Example I above, while when utilizing ammonia in a mole ratio of about 2:1 per mole of nitrile and higher conditions of temperature, lower yields of the desired product were obtained in Examples II and III.

We claim as our invention:

1. A process for the preparation of an iminobisalkylamine which comprises treating an iminodialkylnitrile in which the alkyls each contain from 1 to about 3 carbon atoms with hydrogen at a temperature in the range of from about 50° to about 80° C. and at a pressure in the range of from about 300 to about 600 pounds per square inch in the presence of ammonia, and a hydrogenation catalyst, and recovering the amine.

2. A process for the preparation of an iminobisalkylamine which comprises treating an iminodialkylnitrile in which the alkyls each contain from 1 to about 3 carbon atoms with hydrogen at a temperature in the range of from about 50° to about 80° C. and at a pressure in the range of from about 300 to about 600 pounds per square inch in the presence of ammonia, and a nickel catalyst, and recovering the amine.

3. A process for the preparation of an iminobisalkylamine which comprises treating an iminodialkylnitrile in which the alkyls each contain from 1 to about 3 carbon atoms with hydrogen at a temperature in the range of from about 50° to 80° C. and at a pressure in the range of from about 300 to about 600 pounds per square inch in the presence of ammonia and a hydrogenation catalyst comprising nickel composited on kieselguhr, and recovering the amine.

4. A process for the preparation of an iminobisalkylamine which comprises treating an iminodialkylnitrile in which the alkyls each contain from 1 to about 3 carbon atoms with hydrogen at a temperature in the range of from about 50° to about 80° C. and at a pressure in the range of from about 300 to about 600 pounds per square inch in the presence of ammonia and a hydrogenation catalyst comprising Raney nickel, and recovering the amine.

5. A process for the preparation of an iminobisalkylamine which comprises treating an iminodialkylnitrile in which the alkyls each contain from 1 to about 3 carbon atoms with hydrogen at a temperature in the range of from about 50° to about 80° C. and at a pressure in the range of from about 300 to about 600 pounds per square inch in the presence of ammonia, an alcoholic solvent and a nickel hydrogenation catalyst, and recovering the amine.

6. A process as set forth in claim 1, in that said ammonia is present in a mole ratio from about 3:1 to about 5:1 per mole of dialkylnitrile.

7. A process of claim 1, in that said catalyst is present in an amount of from about 15% to about 25% by weight of the dialkylnitrile.

8. A process for the preparation of iminobispropylamine which comprises treating $\beta,\beta'$-iminodipropionitrile with hydrogen at a temperature in the range of from about 50° to about 80° C. and at a pressure in the range of from about 300 to about 600 pounds per square inch in the presence of ammonia, said ammonia being present in a mole ratio of from about 3:1 to about 5:1 per mole of iminodipropionitrile and a hydrogenation catalyst comprising nickel composited on kieselguhr, said catalyst being present in an amount of from about 15% to about 25% by weight of the iminodipropionitrile, and recovering the iminobispropylamine.

9. A process for the preparation of 3,3'-iminobisbutylamine which comprises treating $\beta,\beta'$-iminodibutyronitrile with hydrogen at a temperature in the range of from about 50° C. to about 80° C. and at a pressure in the range of from about 300 to about 600 pounds per square inch in the presence of ammonia, said ammonia being present in a mole ratio of from about 3:1 to about 5:1 per mole of $\beta,\beta'$-iminodibutyronitrile and a hydrogenation catalyst comprising nickel composited on kieselguhr, said catalyst being present in an amount of from about 15% to about 25% by weight of the iminodibutyronitrile, and recovering the 3,3'-iminobisbutylamine.

10. A process for the preparation of iminobispropylamine which comprises treating $\beta,\beta'$-iminodipropionitrile with hydrogen at a temperature in the range of from about 50° to about 80° C. and at a pressure in the range of from about 300 to about 600 pounds per square inch in the presence of methanol and ammonia, said ammonia being present in a mole ratio of from about 3:1 to about 5:1 per mole of iminodipropionitrile and a hydrogenation catalyst comprising nickel composited on kieselguhr, said catalyst being present in an amount of from about 15% to about 25% by weight of the iminodipropionitrile, and recovering the iminobispropylamine.

11. A process for the preparation of 3,3'-iminobisbutylamine which comprises treating $\beta,\beta'$-iminodibutyronitrile with hydrogen at a temperature in the range of from 50° to about 80° C. and at a pressure in the range of from about 300 to about 600 pounds per square inch in the presence of methanol and ammonia, said ammonia being present in a mole ratio of from about 3:1 to about 5:1 per mole of $\beta,\beta'$-iminodibutyronitrile and a hydrogenation catalyst comprising nickel composited on kieselguhr, said catalst being present in an amount of from about 15% to about 25% by weight of the iminodibutyronitrile, and recovering the 3,3'-iminobisbutylamine.

References Cited by the Examiner

UNITED STATES PATENTS 2,166,151   7/39   Howk _____ 260—583

CHARLES B. PARKER, *Primary Examiner.*